(12) United States Patent
Marsden et al.

(10) Patent No.: US 7,736,487 B2
(45) Date of Patent: *Jun. 15, 2010

(54) PROCESS FOR RECOVERY OF COPPER FROM COPPER-BEARING MATERIAL USING PRESSURE LEACHING, DIRECT ELECTROWINNING AND SOLUTION EXTRACTION

(75) Inventors: John O. Marsden, Paradise Valley, AZ (US); John C. Wilmot, Anthem, AZ (US); Christy Green, Morenci, AZ (US); Wayne W. Hazen, Lakewood, CO (US); David R. Baughman, Golden, CO (US)

(73) Assignee: Freeport-McMoran Corporation, Phoenix, AZ (US)

( * ) Notice: Subject to any disclaimer, the term of this patent is extended or adjusted under 35 U.S.C. 154(b) by 308 days.

This patent is subject to a terminal disclaimer.

(21) Appl. No.: 11/743,034

(22) Filed: May 1, 2007

(65) Prior Publication Data

US 2008/0023342 A1    Jan. 31, 2008

Related U.S. Application Data

(63) Continuation-in-part of application No. 10/976,482, filed on Oct. 29, 2004, now abandoned, which is a continuation-in-part of application No. 11/163,762, filed on Oct. 28, 2005, now Pat. No. 7,485,216.

(60) Provisional application No. 60/746,122, filed on May 1, 2006.

(51) Int. Cl.
    *C25C 1/00* (2006.01)
(52) U.S. Cl. .................. 205/580; 423/24; 205/581; 205/582; 205/583
(58) Field of Classification Search .................. 423/24, 423/27; 205/580–583; 241/23; 75/743
See application file for complete search history.

(56) References Cited

U.S. PATENT DOCUMENTS

| | | | |
|---|---|---|---|
| 3,260,593 A | 7/1966 | Zimmerley et al. |
| 3,528,784 A | 9/1970 | Green |
| 3,637,371 A | 1/1972 | Mackiw et al. |
| 3,656,888 A | 4/1972 | Barry et al. |
| 3,669,651 A | 6/1972 | Spedden et al. |
| 3,775,099 A | 11/1973 | Coffield et al. |
| 3,868,440 A | 2/1975 | Lindblad et al. |
| 3,896,208 A | 7/1975 | Dubeck et al. |
| 3,917,519 A | 11/1975 | Fisher et al. |
| 3,949,051 A | 4/1976 | Pawlek et al. |
| 3,958,985 A | 5/1976 | Anderson |
| 3,961,028 A | 6/1976 | Parker et al. |
| 3,962,402 A | 6/1976 | Touro |
| 3,967,958 A | 7/1976 | Coffield et al. |
| 3,985,553 A | 10/1976 | Kunda et al. |
| 3,991,159 A | 11/1976 | Queneau et al. |
| 4,017,309 A | 4/1977 | Johnson |
| 4,020,106 A | 4/1977 | Ackerley et al. |
| 4,028,462 A | 6/1977 | Domic et al. |
| 4,029,733 A | 6/1977 | Faugeras et al. |
| 4,039,405 A | 8/1977 | Wong |
| 4,039,406 A | 8/1977 | Stanley et al. |
| 4,046,851 A | 9/1977 | Subramanian et al. |
| 4,067,802 A | 1/1978 | Cronberg et al. |
| 4,069,119 A | 1/1978 | Wong |
| 4,091,070 A | 5/1978 | Riggs et al. |
| 4,093,526 A | 6/1978 | Blanco et al. |
| 4,120,935 A | 10/1978 | Fountain et al. |
| 4,150,976 A | 4/1979 | Dain |
| 4,157,912 A | 6/1979 | Weir et al. |
| 4,165,362 A | 8/1979 | Reynolds |
| 4,256,553 A | 3/1981 | Baczek et al. |
| 4,266,972 A | 5/1981 | Redondo Abad et al. |
| 4,272,341 A | 6/1981 | Lamb |
| 4,338,168 A | 7/1982 | Stanley et al. |
| 4,405,569 A | 9/1983 | Dienstbach |
| 4,415,540 A | 11/1983 | Wilkomirsky et al. |
| 4,442,072 A | 4/1984 | Baglin et al. |
| 4,507,268 A | 3/1985 | Kordosky et al. |
| 4,571,264 A | 2/1986 | Weir et al. |

(Continued)

FOREIGN PATENT DOCUMENTS

AU    0219785    3/1957

(Continued)

OTHER PUBLICATIONS

Non-Final Office Action mailed on Mar. 21, 2008 in U.S. Appl. No. 10/976,482.
Final Office Action mailed on Oct. 15, 2008 in U.S. Appl. No. 10/976.482.
Non-Final Office Action mailed on Apr. 28, 2009 in U.S. Appl. No. 10/976,482.
Non-Final Office Action for U.S. Appl. No. 11/163,762 dated Dec. 28, 2007.
Notice of Allowance for U.S. Appl. No. 11/163,762 dated Jul. 21, 2008.
Notice of Allowance for U.S. Appl. No. 11/163,762 dated Oct. 9, 2008.

(Continued)

*Primary Examiner*—Steven Bos
(74) *Attorney, Agent, or Firm*—Snell & Wilmer L.L.P.

(57) ABSTRACT

The present invention relates generally to a process for recovering copper and/or other metal values from a metal-bearing ore, concentrate, or other metal-bearing material using pressure leaching and direct electrowinning. More particularly, the present invention relates to a substantially acid-autogenous process for recovering copper from chalcopyrite-containing ore using pressure leaching and direct electrowinning in combination with a leaching, solvent/solution extraction and electrowinning operation. In accordance with one aspect of the process, at least a portion of the residue from the pressure leaching operation is directed to a heap, stockpile or other leaching operation.

19 Claims, 4 Drawing Sheets

U.S. PATENT DOCUMENTS

| | | | |
|---|---|---|---|
| 4,606,764 | A | 8/1986 | Hazen et al. |
| 4,619,814 | A | 10/1986 | Salter et al. |
| 4,775,413 | A | 10/1988 | Horton et al. |
| 4,814,007 | A | 3/1989 | Lin et al. |
| 4,875,935 | A | 10/1989 | Gross et al. |
| 4,880,607 | A | 11/1989 | Horton et al. |
| 4,892,715 | A | 1/1990 | Horton |
| 4,895,597 | A | 1/1990 | Lin et al. |
| 4,971,662 | A | 11/1990 | Sawyer et al. |
| 4,992,200 | A | 2/1991 | Lin et al. |
| 5,028,259 | A | 7/1991 | Lin et al. |
| 5,059,403 | A | 10/1991 | Chen |
| 5,073,354 | A | 12/1991 | Fuller et al. |
| 5,176,802 | A | 1/1993 | Duyvesteyn et al. |
| 5,223,024 | A | 6/1993 | Jones |
| 5,232,491 | A | 8/1993 | Corrans et al. |
| 5,316,567 | A | 5/1994 | Jones |
| 5,356,457 | A | 10/1994 | Alvarez et al. |
| 5,431,717 | A | 7/1995 | Kohr |
| 5,573,575 | A | 11/1996 | Kohr |
| 5,628,817 | A | 5/1997 | Fugleberg et al. |
| 5,645,708 | A | 7/1997 | Jones |
| 5,650,057 | A | 7/1997 | Jones |
| 5,670,035 | A | 9/1997 | Virnig et al. |
| 5,676,733 | A | 10/1997 | Kohr |
| 5,698,170 | A | 12/1997 | King |
| 5,730,776 | A | 3/1998 | Collins et al. |
| 5,770,170 | A | 6/1998 | Collins et al. |
| 5,849,172 | A | 12/1998 | Allen et al. |
| 5,869,012 | A | 2/1999 | Jones |
| 5,874,055 | A | 2/1999 | Jones |
| 5,895,633 | A | 4/1999 | King |
| 5,902,474 | A | 5/1999 | Jones |
| 5,914,441 | A | 6/1999 | Hunter et al. |
| 5,917,116 | A | 6/1999 | Johnson et al. |
| 5,985,221 | A | 11/1999 | Knecht |
| 5,989,311 | A | 11/1999 | Han et al. |
| 5,993,635 | A | 11/1999 | Hourn et al. |
| 6,083,730 | A | 7/2000 | Kohr |
| 6,146,444 | A | 11/2000 | Kohr |
| 6,149,883 | A | 11/2000 | Ketcham et al. |
| RE37,251 | E | 7/2001 | Jones |
| 6,319,389 | B1 | 11/2001 | Fountain et al. |
| 6,428,604 | B1 | 8/2002 | Kerfoot et al. |
| 6,451,089 | B1 | 9/2002 | Marsden et al. |
| 6,503,293 | B1 | 1/2003 | Dempsey et al. |
| 6,537,440 | B1 | 3/2003 | Richmond et al. |
| 6,569,224 | B2 | 5/2003 | Kerfoot et al. |
| 6,660,059 | B2 | 12/2003 | Ji et al. |
| 6,663,689 | B2 | 12/2003 | Marsden et al. |
| 6,676,909 | B2 | 1/2004 | Marsden et al. |
| 6,680,034 | B2 | 1/2004 | Marsden et al. |
| 6,972,107 | B2 | 12/2005 | Marsden et al. |
| 7,341,700 | B2 | 3/2008 | Marsden et al. |
| 7,485,216 | B2 | 2/2009 | Marsden et al. |
| 2003/0019331 | A1 | 1/2003 | Marsden et al. |
| 2004/0146438 | A1 | 7/2004 | Marsden et al. |
| 2004/0146439 | A1 | 7/2004 | Marsden et al. |
| 2005/0109163 | A1 | 5/2005 | Marsden et al. |
| 2005/0126923 | A1 | 6/2005 | Marsden et al. |
| 2005/0155459 | A1 | 7/2005 | Marsden et al. |
| 2006/0016697 | A1 | 1/2006 | Gilbert et al. |
| 2006/0144717 | A1 | 7/2006 | Marsden et al. |
| 2006/0196313 | A1 | 9/2006 | Marsden et al. |

FOREIGN PATENT DOCUMENTS

| | | |
|---|---|---|
| CL | 1657-2000 | 11/2002 |
| GB | 2108480 | 5/1983 |
| WO | WO 00/73520 | 12/2000 |
| WO | WO 01/00889 | 1/2001 |
| WO | WO 01/00890 | 1/2001 |
| WO | WO 02/08125 | 1/2002 |
| WO | WO 2006/049632 | 5/2006 |

OTHER PUBLICATIONS

Supplemental Notice of Allowance for U.S. Appl. No. 11/163,762 dated Dec. 3, 2008.

Non-Final Office Action for U.S. Appl. No. 12/344,842 dated Mar. 2, 2009.

IPER for PCT/US01/23366 dated Oct. 23, 2002.

ISR for PCT/US02/23454 dated Jun. 12, 2003.

Written Opinion for PCT/US01/23468 dated Jul. 17, 2002.

IPER for PCT/US01/23468 dated Dec. 17, 2002.

ISR/WO for PCT/US07/67943 dated Aug. 29, 2007.

IPRP for PCT/US07/067943 dated Nov. 4, 2008.

ISR/WO for PCT/US04/042038 dated Jun. 15, 2005.

IPRP for PCT/US04/042038 dated May 10, 2007.

Beckstead, L.W., et al., "Acid Ferric Sulfate Leaching of Attritor-Ground Chalcopyrite Concentrate," 11 Extractive Metallurgy of Copper 31:611-32 (American Institute of Mining, Metallurgical, and Petroleum Engineers, Inc.) (1976).

Berezowsky, R.M.G.S., "The Commercial Status of Pressure Leaching Technology," JOM, 43:2, 9-15 (Feb. 1991) (abstract only).

Chmielewski, T., "Pressure Leaching of a Sulphide Copper Concentrate with Simultaneous Regeneration of the Leaching Agent," Hydrometallurgy, 13:1, 63-72 (1984) (no month).

Dalton, et al., "The Cuprex Process—a new chloride-based hydrometallurgical process for the recovery of copper from sulphidic ores," 11 pages (1987).

Dannenberg, R.O., "Recovery of Cobalt and Copper from Complex Sulfide Concentrates," Government Report, 20 pages, Report No. BM RI 9138, U.S. Dept. of Interior (1987) No Month (Abstract Only).

Dreisinger, D.B., et al., "The Total Pressure Oxidation of El Indio Ore and Concentrate," COPPER 1999, vol. IV: Hydrometallurgy of Copper, pp. 181-195 (Oct. 1999).

Duyvesteyn, et al., "The Escondida Process for Copper Concentrates," The Paul E. Queneau International Symposium Extractive Metallurgy of Copper, Nickel, and Cobalt, vol. 1, Fundamental Aspects, pp. 881-885 (1998) No month.

Evans, et al., International Symposium of Hydrometallurgy (Mar. 1, 1973) 2 pages.

Hackl, R.P., "Effect of Sulfur-Dispersing Surfactants on the Oxygen Pressure Leaching of Chalcopyrite," (paper from Copper 95) vol. III, 559-577, Met. Soc. Of CIM (Nov. 1995).

Hackl, R.P., "Passivation of Chalcopyrite During Oxidative Leaching in Sulfate Media," Hydrometallurgy 39; pp. 25-48 (1995).

Hirsch, H.E., "Leaching of Metal Sulphides," Patents UK No. 1,598,454, 7 pages (Sep. 23, 1981) (Abstract only).

Hoffman, J.E., "The Purification of Copper Refinery Electrolytes," JOM, The Society, TMS, Warrendale, PA, US, vol. 56, No. 7, Jul. 2004, pp. 30-33.

King, Jim A., Autoclaving of Copper Concentrates (paper from COPPER 95), vol. III, Electrorefining and Hydrometallurgy of Copper, Int'l Conference held in Santiago, Chile (Nov. 1995) (Abstract only).

King, Jim A., "The Total Pressure Oxidation of Copper Concentrates," The Paul E.Q. Int'l Symposium extractive Metallurgy of Copper, Nickel and Cobalt vol. I, Fundamental Aspects, Minerals, Metals & Materials Society, pp. 735-757 (Oct. 1993).

Mackiw, V.N., Direct Acid Pressure Leaching of Chalcotite Concentrate, JOM 19:2, (Feb. 1967) (Abstract only).

Opposition to CL 1767-2001 by Anglo American PLC (with accompanying English translation of substantive assertions) (no date).

Richmond, G.D., The Commissioning and Operation of a Copper Sulphide Pressure Oxidation Leach Process at Mt. Gordon, Alta Copper 1999: Copper Sulphides Symposium & Copper Hydrometallurgy Forum (Gold Coast, Queensland, Australia Conference) (1999).

Ritcey, G.M., et al., "Solvent Extraction, Principles and Applications to Process Metallurgy, Part II", pp. 218-221 (1979).

Szymanowski, J., "Dydroxyoximes and Copper Hydrometallurgy," (CRC Press) 6 pages (no date).

PROCESS FOR RECOVERY OF COPPER FROM COPPER-BEARING MATERIAL USING PRESSURE LEACHING, DIRECT ELECTROWINNING AND SOLUTION EXTRACTION

CROSS-REFERENCE TO RELATED APPLICATIONS

This is a continuation-in-part application of, and claims priority to U.S. patent application Ser. No. 10/976,482, entitled "Process for recovery of copper from copper-bearing material using medium temperature pressure leaching, direct electrowinning and solvent/solution extraction" and filed Oct. 29, 2004 now abandoned: and is a continuation-in-part of, and claims priority to U.S. patent application Ser. No. 11/163,762, entitled "Process for recovery of copper from copper-bearing material using pressure leaching, direct electrowinning and solvent/solution extraction" and filed Oct. 28, 2005 now U.S. Pat. No. 7,485,216: and claims priority to U.S. Provisional Application Ser. No. 60/746,122, entitled "Process for recovery of copper from copper-bearing material using pressure leaching, direct electrowinning and solvent/solution extraction" and filed May 1, 2006; all of which applications, in their entirety, are hereby incorporated by reference herein.

FIELD OF INVENTION

The present invention relates generally to a process for recovering copper and other metal values from a metal-bearing material using pressure leaching and direct electrowinning. More particularly, the present invention relates to a process using fine grinding, pressure leaching, and direct electrowinning in combination with solvent/solution extraction to recover metal from the metal-bearing material.

BACKGROUND OF THE INVENTION

Hydrometallurgical treatment of copper-containing materials, such as copper ores, copper-bearing concentrates, and other copper-bearing materials, has been well established for many years. However, an effective and efficient method to recover copper from copper-containing materials, especially copper from copper sulfides such as chalcopyrite and chalcocite, that enables high copper recovery to be achieved at a reduced cost over conventional processing techniques would be advantageous.

SUMMARY OF THE INVENTION

In general, according to various aspects of the present invention, a process for recovering copper and other metal values from a metal-bearing material includes various physical conditioning, reaction, and recovery processes. For example, in accordance with the various embodiments of the present invention, fine grinding of the metal-bearing material prior to reactive processing, such as by medium or high temperature (as will be defined hereinbelow) pressure leaching, results in enhanced metal value recovery and various other advantages over prior art metal recovery processes. Moreover, proper conditioning enables direct electrowinning of copper from a pressure leaching product stream without the use of an intermediate solvent/solution extraction step. Further, at least a portion of the impurities and excess acid in the process stream are removed through the use of a lean electrolyte bleed stream from electrowinning that may be further processed in a solvent/solution extraction and electrowinning operation.

In accordance with one exemplary embodiment of the present invention, a process for recovering copper from a copper-bearing material includes the steps of: (i) providing a feed stream containing copper-bearing material; (ii) subjecting the copper-bearing feed stream to controlled fine grinding; (iii) pressure leaching the copper-bearing feed stream to yield a copper-containing solution; (iv) recovering cathode copper from the copper-containing solution; (v) treating at least a portion of a lean electrolyte stream from the copper recovery step in a solvent/solution extraction and electrowinning operation; (vi) recycling at least a portion of the lean electrolyte stream to the pressure leaching step to provide some or all of the acid requirement of the pressure leaching operation; and, (vii) directing at least a portion of the pressure leaching residue to a heap, stockpile or other leaching operation.

As used herein, the term "pressure leaching" shall refer to a metal recovery process in which material is contacted with an acidic solution and oxygen under conditions of elevated temperature and pressure.

In accordance with another aspect of an exemplary embodiment of the invention, a bleed stream of lean electrolyte from the electrowinning stage advantageously removes at least a portion of the excess acid from the metal recovery process and also impurities contained therein, thus preventing such impurities from accumulating to deleterious levels in the process and negatively impacting production efficiencies and product (e.g., copper cathode) quality. In accordance with one embodiment of the invention, excess acid removed in the lean electrolyte bleed stream may be utilized in other copper extraction processes, or the acid may be consumed by using suitable materials, such as, for example, low grade copper ore, mining waste products, and/or other rock products containing acid neutralizing minerals, such as limestone, dolomite, feldspar, and the like.

In accordance with another aspect of an exemplary embodiment of the invention, acid generated in the pressure leaching and electrowinning steps is recycled to the pressure leaching step and provides acid needed for effective leaching of copper. In this way, the use of recycled acid-containing solution, rather than concentrated sulfuric acid, is economically advantageous.

In accordance with another aspect of an exemplary embodiment of the invention, residual solids from the pressure leaching step are applied to heaps (crushed or uncrushed), run-of-mine dumps, stockpiles, other leaching operations and/or the like.

These and other advantages of a process according to various aspects of the present invention will be apparent to those skilled in the art upon reading and understanding the following detailed description with reference to the accompanying figures.

BRIEF DESCRIPTION OF THE DRAWING

The subject matter of the present invention is particularly pointed out and distinctly claimed in the concluding portion of the specification. A more complete understanding of the present invention, however, may best be obtained by referring to the detailed description when considered in connection with the drawing figures, wherein like numerals denote like elements and wherein:

DETAILED DESCRIPTION OF EXEMPLARY EMBODIMENTS

Various embodiments of the present invention exhibit significant advancements over prior art processes, particularly with regard to copper recovery and process efficiency. In accordance with an exemplary embodiment of the present invention, a process for recovering copper from a copper-bearing material includes the steps of: (i) providing a feed stream containing copper-bearing material; (ii) subjecting at least a portion of the copper-bearing feed stream to controlled fine grinding; (iii) pressure leaching the copper-bearing feed stream to yield a copper-containing solution; (iv) recovering cathode copper from the copper-containing solution by electrowinning; (v) treating at least a portion of a lean electrolyte stream from the copper recovery step by solvent/solution extraction followed by an electrowinning operation; (vi) recycling at least a portion of the lean electrolyte stream to the pressure leaching step; and, (vii) directing at least a portion of the pressure leaching residue to a heap or other leaching operation.

As used herein, the term "pressure leaching" shall refer to a metal recovery process in which material is contacted with an acidic solution and oxygen under conditions of elevated temperature and pressure.

Existing copper recovery processes that utilize conventional atmospheric or pressure leaching, solvent/solution extraction and electrowinning process steps may, in many instances, be easily retrofitted to exploit the many commercial benefits the present invention provides. Medium or high temperature pressure leaching processes for chalcopyrite are generally thought of as those processes operating at temperatures from about 120° C. to about 190° C. or up to 220° C.

Figure 1:
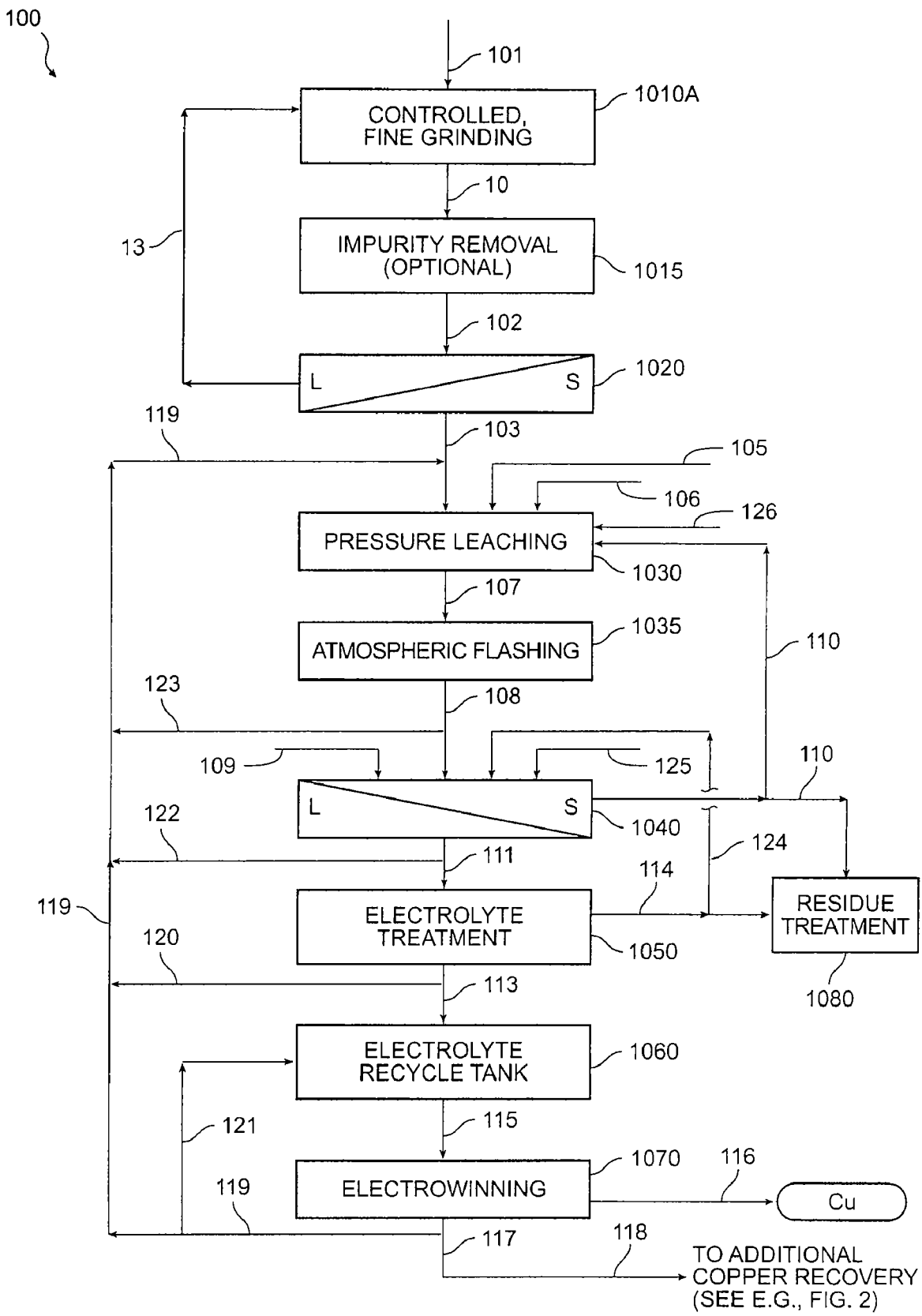
FIG. 1 illustrates a flow diagram of a copper recovery process in accordance with one exemplary embodiment of the present invention.

Referring first to FIG. 1, in accordance with various aspects of the present invention, a metal-bearing material 101 is provided for processing. Metal-bearing material 101 may be an ore, a concentrate, a precipitate, or any other material from which copper and/or other metal values may be recovered. Metal values such as, for example, copper, gold, silver, platinum group metals, nickel, cobalt, molybdenum, rhenium, uranium, rare earth metals, and the like, may be recovered from metal-bearing materials in accordance with various embodiments of the present invention. The various aspects and embodiments of the present invention, however, prove especially advantageous in connection with the recovery of copper from copper-bearing sulfide ores, such as, for example, ores and/or concentrates and/or precipitates containing chalcopyrite ($CuFeS_2$), chalcocite ($Cu_2S$), bornite ($Cu_5FeS_4$), covellite ($CuS$), enargite ($Cu_3AsS_4$), digenite ($Cu_9S_5$) and mixtures thereof. Thus, metal-bearing material 101 preferably is a copper ore, concentrate or precipitate, and, more preferably, is a copper-bearing sulfide ore, concentrate or precipitate. In accordance with yet another aspect of the present invention, metal-bearing material 101 may comprise a concentrate that is not a flotation concentrate or precipitate thereof. For ease of discussion, the description of various exemplary embodiments of the present invention hereinbelow generally focuses on the recovery of desired metal values from chalcopyrite-containing ore or concentrate, however, any suitable metal bearing material may be utilized.

In accordance with an exemplary embodiment of the present invention, copper is the metal to be recovered from a metal-bearing material, such as a copper sulfide concentrate. One aspect of this exemplary embodiment involves use of a copper sulfide concentrate produced by froth flotation. In preparation for froth flotation, the metal-bearing material feed stream is ground to a particle size suitable to liberate mineral-bearing particles from gangue materials. However, as noted above, other concentrates may also be utilized.

Metal-bearing material 101 may be prepared for metal recovery processing in any manner that enables the conditions of metal-bearing material 101 to be suitable for the chosen processing method, as such conditions may affect the overall effectiveness and efficiency of processing operations. For example, feed stream conditions such as particle size, composition, and component concentrations can affect the overall effectiveness and efficiency of downstream processing operations, such as, for example, atmospheric leaching or pressure leaching. Desired composition and component concentration parameters can be achieved through a variety of chemical and/or physical processing stages, the choice of which will depend upon the operating parameters of the chosen processing scheme, equipment cost and material specifications.

It is generally known that hydrometallurgical processes, particularly pressure leaching processes, are sensitive to particle size. Thus, it is common practice in the area of extractive hydrometallurgy to finely divide, grind, and/or mill mineral species to reduce particle sizes prior to processing by pressure leaching. It generally has been appreciated that reducing the particle size of a mineral species, such as, for example, a copper sulfide, enables pressure leaching under less extreme conditions of pressure and temperature to achieve the same metal extraction as achieved under conditions of higher temperature and pressure. The particle size distribution can also affect other leaching conditions, such as, for example, acid concentration and oxygen overpressure.

A variety of acceptable techniques and devices for reducing the particle size of the metal-bearing material are currently available, such as ball mills, tower mills, superfine grinding mills, attrition mills, stirred mills, horizontal mills and the like, and additional techniques may later be developed that may achieve the desired result of increasing the surface area of the material to be processed.

For example, metal-bearing material 101 may be prepared for metal recovery processing by controlled fine grinding. Preferably, it is advantageous not only to reduce the size of the metal-bearing material particles in the process stream, but also to ensure that the weight proportion of the coarsest particles is minimized. Significant advantages in processing efficiency and copper recovery are achievable by enabling substantially all particles to react substantially completely.

Figure 1A:
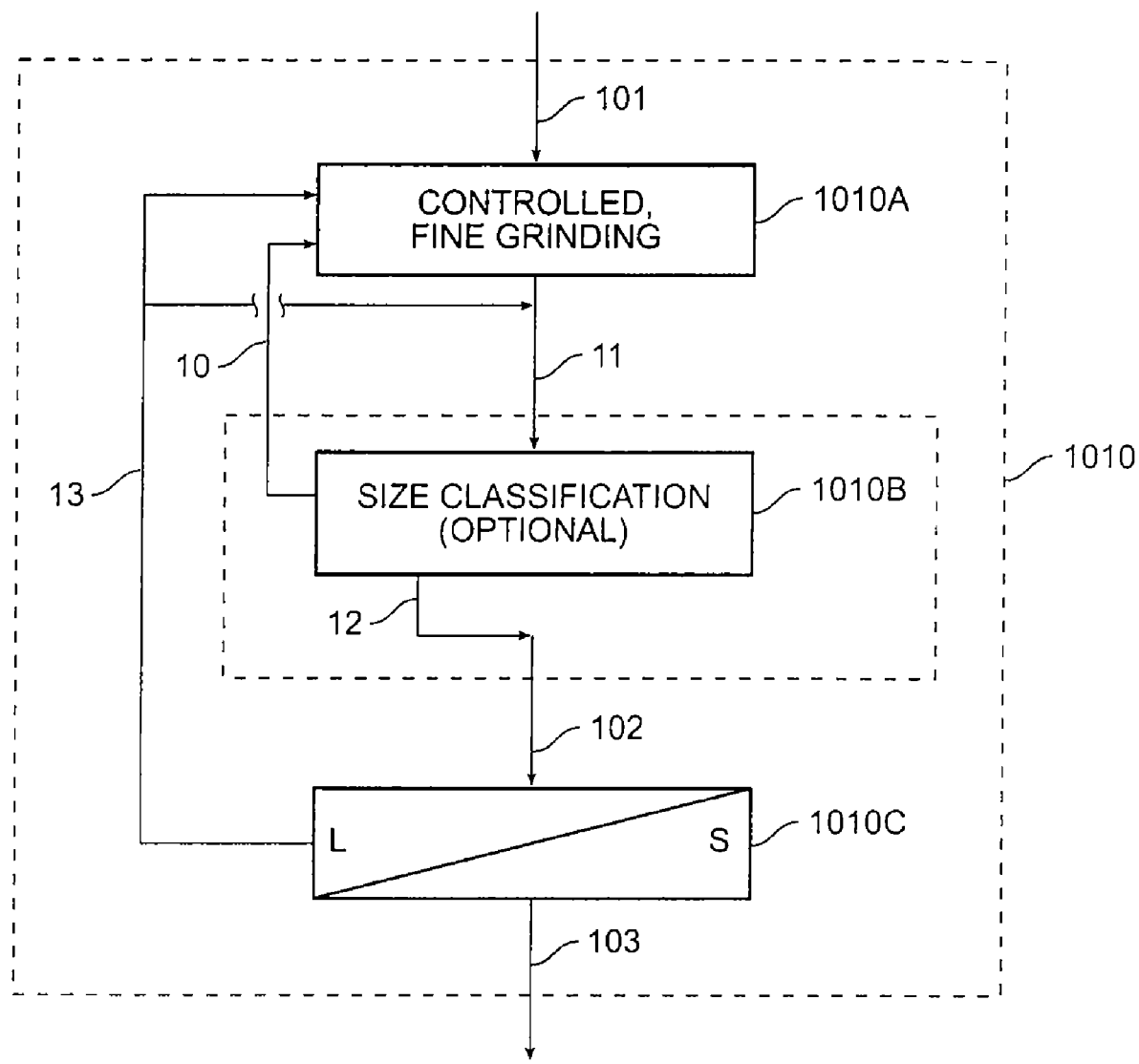
FIG. 1A illustrates a flow diagram of an aspect of an exemplary embodiment of the present invention.

In accordance with one embodiment of the present invention, and with reference to FIG. 1 and FIG. 1A, while controlled fine grinding may utilize any now known or hereafter devised methodology, in general, grinding step 1010 includes controlled, fine grinding step 1010A, optional size classification step 1010B and solid liquid separation step 1010C. Preferably, grinding in accordance with this aspect of the present invention proceeds in a staged or closed-circuit manner. That is, preferably the coarsest particles of metal-bearing material 101 are suitably ground to the desired level, while particles already at or below the desired level are subjected to little or no additional grinding. As such, cost savings can be obtained in connection with grinding operations, while at the same time limiting the size and weight proportion of the coarsest particles. However, open-circuit grinding may also produce an acceptable product.

With continued reference to FIG. 1A, preferably cyclone technology, such as, for example, use of cyclones, or mini-cyclones, is utilized to facilitate size classification step 1010B by separating relatively coarse materials from relatively fine materials. That is, after material 101 is ground in controlled fine grinding step 1010A, the coarse material 10 is suitably separated from the fine material 12, such that coarse material 10 may be further ground, as shown in FIG. 1A in stream 11. Similarly, in accordance with one aspect of an exemplary embodiment of the invention wherein the chosen grinding method and apparatus utilize a liquid processing agent (such as, for example, process water) to facilitate grinding in super-fine grinding stage 1010, an optional solid-liquid separation stage 1010C may be utilized to remove excess processing liquid 13 from the process stream 102 prior to pressure leaching, and preferably recycle excess process liquid 13 to super-fine grinding stage 1010A for reuse. Depending upon the configuration of the grinding apparatus, solid-liquid separation stage 1010C may or may not be required. If, however, process liquid is added to copper-containing material 101 prior to or during super-fine grinding 1010, it may be desirable to remove at least a portion of the added process liquid from copper-containing material stream 102 prior to pressure leaching operation 1030 to optimize slurry density.

Grinding step 1010 preferably results in material 110 being finely ground, such that the particle size of the material being processed is reduced such that substantially all of the particles are small enough to react substantially completely during pressure leaching.

Various particle sizes and particle size distributions may be advantageously employed in accordance with various aspects of the present invention. For example, in accordance with one aspect of the present invention grinding step 1010 results in material 110 being finely ground to a P80 on the order of less than about 25 microns, and preferably on the order of a P80 between about 13 and about 20 microns.

In accordance with another aspect of the present invention, the copper-containing material has a P80 of less than about 250 microns, preferably a P80 from about 75 to about 150 microns, and more preferably a P80 on the order of from about 5 to about 75 microns.

In accordance with yet another aspect of the present invention, a particle size distribution of approximately 98 percent passing about 25 microns is preferable, and more preferably, the metal-bearing material stream has a particle size distribution of approximately 98 percent passing from about 10 to about 23 microns, and optimally from about 13 to about 15 microns.

While, as noted, grinding step 1010 may be conducted in any manner, satisfactory controlled fine grinding may be achieved using a fine grinding apparatus, such as, for example, a stirred horizontal shaft mill with baffles or a vertically stirred mill without baffles. Such exemplary apparatus include the Isamill developed jointly by Mount Isa Mines (MIM), Australia, and Netzsch Feinmahltechnik, Germany and the SMD or Detritor mill, manufactured by Metso Minerals, Finland. Preferably, if a horizontal mill is utilized, the grinding medium would be 1.2/2.4 mm or 2.4/4.8 mm Colorado sand, available from Oglebay Norton Industrial Sands Inc., Colorado Springs, Colo. However, any grinding medium that enables the desired particle size distribution to be achieved may be used, the type and size of which may be dependent upon the application chosen, the product size desired, grinding apparatus manufacturer's specifications, and the like. Exemplary media include, for example, sand, silica, metal beads, ceramic beads, and ceramic balls.

The comminuted metal-bearing material may be combined with a liquid prior to entering reactive processing stage 1030 (described hereinbelow). Preferably, if employed, the liquid comprises water, but any suitable liquid may be employed, such as, for example, raffinate, pregnant leach solution, or lean electrolyte. For example, a portion of the lean electrolyte from the direct electrowinning process (for example, stream 119) may be combined with comminuted metal-bearing material to form metal-bearing material stream 103 for delivery to reactive processing stage 1030. In this way, acid is recycled to the process stream such that it helps to satisfy the acid demand of reactive processing stage 1030.

The combination of a liquid with the metal-bearing material can be accomplished using any one or more of a variety of techniques and apparatus, such as, for example, in-line blending or using a mixing tank or other suitable vessel. In accordance with an exemplary aspect of an embodiment of the invention, the concentration of solid metal-bearing material in the material stream (i.e., the slurry density) is on the order of less than about fifty (50) percent by weight of the stream, and preferably about forty (40) percent by weight of the stream. Other slurry densities that are suitable for transport and subsequent processing may, however, be used.

In accordance with one aspect of the present invention, it is desirable to separate the copper in a recycled stream of lean electrolyte from electrowinning from the acid, and also to reduce the amount of contaminants in the portion of the stream to be subjected to the metal recovery process. In such a separation process, the acid that is removed from the recycled lean electrolyte stream may be rejected from the process circuit, taking with it at least a portion of the metal contaminants and other soluble impurities from the copper-containing feed stream and the recycled lean electrolyte stream. Any number of conventional or hereafter devised separation processes and techniques may be useful to achieve the separation of copper from acid in the feed stream. For example, separation processes and/or techniques such as precipitation, low temperature pressure leaching, acid solvent extraction/ion exchange, membrane separation, cementation, pressure reduction, sulfiding, and/or the use of liberator cells may be useful for this purpose.

The separation aspect of a preferred embodiment of the invention contributes to providing a resultant acid stream that contains a relatively small fraction of copper, which can be used for leaching, pH control, or other applications. Moreover, utilization of a separation process in accordance with this aspect of the invention may be particularly advantageous in that it may enable contaminants from the unrefined copper-containing material stream to be removed from the copper-containing material stream and incorporated into the resultant acid stream. Because the resultant acid stream is preferably removed from the metal recovery process altogether and utilized in remote operations, disposed of, or neutralized, the contaminants contained therein are likewise removed from the metal recovery process and are thus prevented from accumulating in the process stream. This may be a significant advantage in that such contaminants, particularly metal contaminants, typically have a deleterious effect on the effectiveness and efficiency of the desired metal recovery process. For example, metal contaminants and other impurities in the process stream, if not carefully controlled and/or minimized, can contribute to diminished physical and/or chemical properties in the cathode copper produced by electrowinning, and can thus degrade the copper product and diminish its economic value.

Referring again to FIG. 1, in accordance with one aspect of a preferred embodiment of the invention, copper-containing material stream 101 is subjected to a separation, such as, for example, a precipitation step, which, in this exemplary process, serves to precipitate solubilized copper from a recycled lean electrolyte stream onto the surfaces of solid particles in the copper-containing material stream. As discussed in detail above, this aspect offers an important advantage in that it enables recovery of copper from a lean electrolyte stream that otherwise may have been lost or would have required additional processing to recover, potentially resulting in significant economic benefits.

In this preferred aspect of the invention, the precipitation step involves the copper-containing material stream being combined with a sulfur dioxide ($SO_2$) stream 109 and a lean electrolyte stream 108 in a suitable processing vessel. For example, in the embodiment illustrated in FIG. 1, lean electrolyte stream 108 may comprise a recycled acidic copper sulfate stream generated during an electrowinning operation. Other streams, however, preferably copper-rich streams, may also be used. Preferably, precipitation is carried out such that the copper from the lean electrolyte precipitates, at least in part, onto the surface of unreacted copper-containing material particles within stream 101 in the form of copper sulfides, such as, for example, CuS.

In accordance with a preferred aspect of the invention, copper separation stage 1010 is carried out at a slightly elevated temperature, such as from about 70° C. to about 180° C., preferably from about 80° C. to about 100° C., and most preferably at a temperature of about 90° C. Heating, if necessary, can be effectuated through any conventional means, such as electric heating coils, a heat blanket, process fluid heat exchange, and other ways now known or later developed. In an exemplary process, steam may be generated in other process areas, and may be directed to the processing vessel in copper separation stage 1010 to provide the heat desired to enhance the precipitation process. The residence time for the copper precipitation process can vary, depending on factors such as the operating temperature of the processing vessel and the composition of the copper-containing material, but typically ranges from about thirty (30) minutes to about 6 hours. Preferably, conditions are selected such that significant amounts of copper are precipitated. For example, precipitation rates on the order of about 98% precipitation of copper have been achieved in processing vessels maintained at about 90° C. for about 4 hours.

Referring to FIG. 1, after metal-bearing material stream 103 has been suitably prepared for processing by controlled fine grinding, liquid addition, and, optionally, other physical and/or chemical conditioning processes, it is subjected to a reactive processing step 1030, for example, metal extraction via pressure leaching. In accordance with one embodiment of the present invention, reactive processing step 1030 comprises pressure leaching. Preferably, reactive processing step 1030 is a medium temperature pressure leaching process operating at a temperature in the range of about 140° C. to about 230° C. In accordance with one embodiment, pressure leaching preferably is conducted in the range of about 140° C. to about 180° C., and generally, above about 160° C., and more preferably in the range of about 160° C. to about 170° C. In accordance with another embodiment, pressure leaching is conducted at temperatures above 180° C., and preferably in the range of about 180° to about 220° C., and more preferably in the range of about 190° C. to about 210° C.

In accordance with various aspects of the present invention, the optimum temperature range selected for operation will tend to maximize the extraction of copper and other metals, optimize production of elemental sulfur (S°), minimize fresh acid consumption, and thereby minimize make-up acid requirements. Acid and sulfur are made from oxidation of sulfide according to the following reactions:

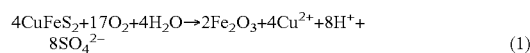

$$4CuFeS_2 + 17O_2 + 4H_2O \rightarrow 2Fe_2O_3 + 4Cu^{2+} + 8H^+ + 8SO_4^{2-} \quad (1)$$

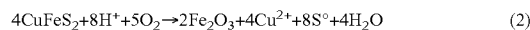

$$4CuFeS_2 + 8H^+ + 5O_2 \rightarrow 2Fe_2O_3 + 4Cu^{2+} + 8S° + 4H_2O \quad (2)$$

Preferably, in accordance with the present invention, the conditions (temperature, acid concentration) for the pressure leaching step are suitably selected to achieve an advantageous balance between reactions (1) and (2), but tending to reduce or eliminate fresh make-up acid consumption and thus the costs associated with acid make-up, but without sacrificing copper extraction to any significant extent.

The amount of acid introduced into the pressure leaching vessel varies depending upon the reaction parameters, particularly, reaction temperature, iron dissolution, copper extraction, and sulfide oxidation. Make-up acid may be introduced into the pressure leaching vessel in the form of fresh acid or recycled acid from the same recovery process or another process. In certain cases, make-up acid is introduced on the order of from about 300 to about 650 kilograms per tonne of concentrate, or less; however, lower make-up acid is required at higher temperatures.

The present inventors have discovered that operating parameters of the metal recovery process of the present invention may be optimized to achieve any number of economic, processability, or production objectives. Generally speaking, for example, at a fixed acid recycle rate, as the temperature in the pressure leaching stage is increased, more oxygen is consumed, more acid is produced, and less elemental sulfur is produced. Iron dissolution can be controlled at higher temperatures by reducing recycled acid from stream 119. Moreover, keeping all other parameters constant, as the temperature in the pressure leaching stage is increased, copper recovery may be maximized. Thus, at increased temperatures and a fixed acid recycle rate, more acid may be produced during pressure leaching (i.e., excess acid that must be consumed) and more oxygen may be consumed, but higher copper recovery may be possible. At lower temperatures (e.g., 140-150° C.), the pressure leaching operation may require more recycled acid and copper recovery may be reduced, but less oxygen is demanded and the cost of consuming excess acid is reduced. Within a temperature range of from about 150° C. to about 170° C., however, an acid autogenous process may be possible—that is, the pressure leaching operation may produce approximately the acid that it requires. As such, it may be possible to reduce or eliminate the costs of make-up acid and acid attenuation while achieving acceptable copper recovery and moderate oxygen consumption. However, in accordance with other embodiments of the present invention higher temperatures may be utilized. For example, on the order of about 200° C. to about 210° C. may tend to enhance copper recovery.

It should be noted that any of the above scenarios may be desirable under certain circumstances. That is, extrinsic factors—such as power and raw material costs or the market price of copper and/or other recoverable metal values—may dictate whether it would be most economically desirable to operate the pressure leaching operation at lower temperatures (e.g., if cost of acid attenuation is higher than acid purchase, if oxygen is expensive, if power costs are high, and/or if copper price is low), or higher temperatures (e.g., if cost of acid attenuation is lower than acid purchase, if acid can be used beneficially elsewhere, if oxygen is inexpensive, if power costs are low, and/or if copper price is high).

At medium temperature conditions (i.e., between about 140° C. and about 180° C.), ferric ion in solution will hydrolyze in the pressure leaching vessel to form hematite and sulfuric acid by the following reaction:

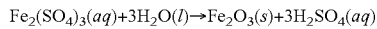

$$Fe_2(SO_4)_3(aq)+3H_2O(l) \rightarrow Fe_2O_3(s)+3H_2SO_4(aq)$$

As the iron concentration in the pressure leaching vessel increases, the iron concentration in the rich electrolyte stream (i.e., the pressure leaching discharge liquor) also increases. Increasing iron in the pressure leaching discharge generally results in an undesirable drop in the current efficiency in subsequent electrowinning operations. Decreased current efficiency in electrowinning results in increased operating costs per unit of copper recovered through electrowinning.

The total acid addition (free acid in solution plus iron-equivalent acid content of solution) to the pressure leaching step is preferably controlled to optimize the copper extraction (as indicated by the copper in the residue) and iron in the rich electrolyte for direct electrowinning. In general, the residue copper content decreases with increasing total acid addition to the pressure leaching step, while the amount of iron in solution tends to increase with increasing total acid addition.

In accordance with an exemplary embodiment of the invention, a process for recovering copper from copper-bearing material is operated such that the highest total acid addition to the pressure leaching vessel is utilized above which there is little or no additional benefit to the residue copper content. In accordance with one embodiment of the invention, the total acid addition to the pressure leaching vessel is in the range of from about 400 to about 500 kg/tonne.

Turning again to FIG. 1, reactive processing step 1030 may occur in any pressure leaching vessel suitably designed to contain the pressure leaching mixture at the desired temperature and pressure conditions for the requisite pressure leaching residence time. In accordance with one aspect of an exemplary embodiment of the invention, the pressure leaching vessel used in processing step 1030 is an agitated, multi-compartment horizontal pressure leaching vessel. However, it should be appreciated that any pressure leaching vessel that suitably permits metal-bearing material stream 103 to be prepared for copper recovery may be utilized within the scope of the present invention.

During reactive processing step 1030, copper and/or other metal values may be solubilized or otherwise liberated in preparation for later recovery processes. Any substance that assists in solubilizing—and thus liberating—the metal value, and thus releasing the metal value from a metal-bearing material, may be used. For example, where copper is the metal being recovered, an acid, such as sulfuric acid, may be contacted with the copper-bearing material such that the copper may be liberated for later recovery steps. However, it should be appreciated that any suitable method of liberating metal values in preparation for later metal recovery steps may be utilized within the scope of this invention.

Any agent capable of assisting in the solubilization of the copper, such as, for example, sulfuric acid, may be provided during the reactive processing step 1030, such as, for example, medium temperature pressure leaching, in a number of ways. For example, such acid may be provided in a cooling stream provided by the recycle of lean electrolyte 119 from electrowinning stage 1070. However, it should be appreciated that any method of providing for the solubilization of copper is within the scope of the present invention. The amount of acid added during pressure leaching preferably is balanced according to the acid needed to optimize copper extraction and, if desired, to achieve a substantially acid autogenous process.

In accordance with various aspects of the present invention, the pressure leaching process occurs in a manner suitably designed to promote substantially complete solubilization of the copper, it may be desirable to introduce additional materials to enhance the pressure leaching process. In accordance with one aspect of the present invention, during pressure leaching in a pressure leaching vessel, sufficient oxygen 105 is injected into the vessel to maintain an oxygen partial pressure from about 50 to about 250 psig, preferably from about 75 to about 220 psig, and most preferably from about 150 to about 200 psig. Furthermore, due to the nature of medium temperature pressure leaching, the total operating pressure (including oxygen partial pressure) in the pressure leaching vessel is generally superatmospheric, preferably from about 100 to about 750 psig, more preferably from about 250 to about 400 psig, and most preferably from about 270 to about 350 psig.

The residence time for pressure leaching can vary, depending on factors such as, for example, the characteristics of the copper-bearing material and the operating pressure and temperature of the pressure leaching vessel. In one aspect of an exemplary embodiment of the invention, the residence time for the medium temperature pressure leaching of chalcopyrite ranges from about 30 to about 180 minutes, more preferably from about 60 to about 150 minutes, and most preferably on the order of about 80 to about 120 minutes.

Control of the pressure leaching process, including control of the temperature in the pressure leaching vessel, may be accomplished by any conventional or hereafter devised method. For example, with respect to temperature control, preferably the pressure leaching vessel includes a feedback temperature control feature. For example, in accordance with one aspect of the invention, the temperature of the pressure leaching vessel is maintained at a temperature in the range of about 140° C. to about 180° C. and more preferably in the range of about 150° C. to about 175° C. In accordance with another aspect of the invention, the temperature may be suitably selected to be above about 180° C., and more preferably in the range of about 180° C. to about 220° C. As such, a wide range of temperatures may be useful in connection with the various aspects of the present invention.

Due to the exothermic nature of pressure leaching of metal sulfides, the heat generated by medium temperature pressure leaching is generally more than that needed to heat the feed stream to the desired operating temperature. Thus, in order to maintain preferable pressure leaching temperature, a cooling liquid 106 may be introduced into the pressure leaching vessel during pressure leaching. In accordance with one aspect of an embodiment of the present invention, cooling liquid 106 is preferably contacted with the feed stream in the pressure leaching vessel during pressure leaching. Cooling liquid 106 may comprise make-up water, but can be any suitable cooling fluid from within the process or from an outside source, such as recycled liquid from the product slurry, lean electrolyte, or a mixture of cooling fluids. Cooling liquid 106 may be introduced into the pressure leaching vessel through the same inlet as feed slurry, or alternatively in any manner that effectuates cooling of the feed slurry. The amount of cooling liquid 106 added to the feed slurry during pressure leaching may vary, depending on the copper and acid concentration of the liquid, the amount of sulfide minerals in the feed slurry and the pulp density of the feed slurry, as well as other parameters of the pressure leaching process. In an exemplary aspect of this embodiment of the invention, a sufficient amount of cooling liquid is added to the pressure leaching vessel to yield a solids content in product stream 108 on the order of less than about 50% solids by weight, more preferably ranging from about 3 to about 35% solids by weight, and most preferably ranging from about 6 to about 15% solids by weight. In accordance with one embodiment of the invention, the cooling liquid is added as lean electrolyte, which effectively controls the acid, iron and copper concentrations in the discharge slurry.

In accordance with an exemplary aspect of the present invention, pressure leaching of stream 103 is performed in the presence of a dispersing agent 126. Suitable dispersing agents useful in accordance with this aspect of the present invention include, for example, organic compounds such as lignin derivatives, such as, for example, calcium and sodium lignosulfonates, tannin compounds, such as, for example, quebracho, orthophenylene diamine (OPD), alkyl sulfonates, such as, for example, sodium alkylbenzene sulfonates, and combinations of the above. Dispersing agent. 126 may be any compound that resists degradation in the temperature range of medium temperature pressure leaching (i.e., from about 140° C. to about 180° C.) long enough to disperse the elemental sulfur produced during the medium temperature pressure leaching process and that achieves the desired result of preventing elemental sulfur from passivating copper values, which may reduce copper extraction. Dispersing agent 126 may be introduced to the pressure leaching vessel in an amount and/or at a concentration sufficient to achieve the desired result. In one aspect of an exemplary embodiment of the invention, favorable results are achievable during pressure leaching of chalcopyrite using calcium lignosulfonate in an amount of about 2 to about 20 kilograms per tonne, and more preferably in an amount of about 4 to about 12 kilograms per tonne; and more preferably in an amount of about 6 to about 10 kilograms per tonne of chalcopyrite concentrate.

In accordance with another exemplary embodiment of the present invention, a seeding agent may be introduced into reactive processing step 1030. A suitable seeding agent may comprise any material capable of forming a nucleation site for the crystallization and/or growth of solid species. Accordingly, the seeding agent may be any particle which acts as a site for particle accumulation and/or precipitation, and may originate from recycled materials from other stages of the metal recovery process or may be provided by the addition of substances that are foreign to the metal recovery process. In some cases, the seeding agent comprises any material that promotes crystallization, precipitation, and/or growth of unwanted materials—for example in the preferred case of copper recovery, hematite, gangue, and the like—that may otherwise tend to partially or completely encapsulate the desired metal values, rendering the desired metal values (e.g., copper and gold) generally unavailable or less accessible to a lixiviant solution.

One source of suitable seeding agents useful in accordance with an aspect of this exemplary embodiment are those materials which can be found in the pressure leaching vessel discharge, which materials may be recycled for seeding purposes. Use of the recycled pressure leaching vessel discharge may be desirable for economic reasons, and using a seeding agent that is similar or identical to unwanted particles in the pressure leaching process slurry may tend to encourage the accumulation of unwanted material. For example, in metal recovery processes where an unwanted material, such as hematite, is either present in the metal-bearing material or is produced as a by-product, introduction of recycled hematite-containing residue from previous pressure leaching processes likely will tend to provide newly formed or liberated hematite a preferential nucleation site. In the absence of this nucleation site, unreactive particles may occlude the desired metal values to solubilization by precipitating on the surface of the metal values, rendering the metal values unrecoverable. Therefore, introducing a seeding agent to prevent such occlusion may assist in providing better metal recovery. In accordance with the exemplary embodiment illustrated in FIG. 1, a portion of the solid residue stream 110 from solid-liquid separation step 1040 provides a suitable seeding material to reactive processing step 1030.

Subsequent to metal-bearing material stream 103 undergoing reactive processing step 1030, the copper and/or other metal values that have been made available by the reactive process undergo one or more of various metal recovery processes. Referring again to FIG. 1, metal recovery process 1070 (discussed hereinbelow) is a process for recovering copper and/or other metal values, and may include any number of preparatory or conditioning steps. For example, a copper-bearing solution may be prepared and conditioned for metal recovery through one or more chemical and/or physical processing steps. The product stream from reactive processing step 1030 may be conditioned to adjust the composition, component concentrations, solids content, volume, temperature, pressure, and/or other physical and/or chemical parameters to desired values and thus to form a suitable copper-bearing solution. Generally, a properly conditioned copper-bearing solution will contain a relatively high concentration of soluble copper in, for example, an acid sulfate solution, and preferably will contain few impurities. In accordance with one aspect of an exemplary embodiment of the invention, however, impurities in the conditioned copper-bearing solution ultimately may be decreased through the use of a separate solvent/solution extraction stage and discussed in connection with the embodiment illustrated in FIG. 2. Moreover, the conditions of the copper-bearing solution preferably are kept substantially constant to enhance the quality and uniformity of the copper product ultimately recovered.

In one aspect of an exemplary embodiment of the present invention, conditioning of a metal-bearing solution for copper recovery in an electrowinning circuit begins by adjusting certain physical parameters of the product slurry from the reactive processing step. In an exemplary aspect of this embodiment of the invention, it may be desirable to reduce the temperature and pressure of the product slurry to approximately ambient conditions. An exemplary method of so adjusting the temperature and pressure characteristics of the metal-bearing product slurry from a medium temperature pressure leaching stage is atmospheric flashing (such as atmospheric flashing stage 1035 shown in FIG. 1). Further, flashed gases, solids, solutions, and steam may optionally be suitably treated, for example, by use of a venturi scrubber wherein water may be recovered and hazardous materials may be prevented from entering the environment.

In accordance with further aspects of this preferred embodiment, after the product slurry has been subjected to atmospheric flashing using, for example, a flash tank, to achieve approximately ambient conditions of pressure and temperature, the product slurry may be further conditioned in preparation for later metal-value recovery steps. For example, one or more solid-liquid phase separation stages (such as solid-liquid separation stage 1040 illustrated in FIG. 1) may be used to separate solubilized metal solution from solid particles. This may be accomplished in any conventional manner, including use of filtration systems, counter-current decantation (CCD) circuits, thickeners, and the like. As illustrated in FIG. 1, in accordance with one embodiment of the invention, conditioning of the product slurry for metal recovery comprises a solid-liquid separation step 1040 and an optional electrolyte treatment step 1050, which further conditions product liquid 111 such as, for example, through filtration, to remove fine solid particles and colloidal matter, such as, for example, silica and/or silica-bearing material. A variety of factors, such as the process material balance, environmental regulations, residue composition, economic considerations, and the like, may affect the decision whether to employ a CCD circuit, one thickener or multiple thickeners, one filter or multiple filters, and/or any other suitable device or combination of devices in a solid-liquid separation apparatus. However, it should be appreciated that any technique of conditioning the product slurry for later metal value recovery is within the scope of the present invention.

As further discussed hereinbelow, the separated solids may further be subjected to later processing steps, including precious metal or other metal value recovery, such as, for example, recovery of gold, silver, platinum group metals, molybdenum, zinc, nickel, cobalt, uranium, rhenium, rare earth metals, and the like, by cyanidation or other techniques. Later processing steps may also include treatment processes to remove or recover other mineral constituents from the separated solids. Alternatively, the separated solids may be subject to impoundment or disposal, or, as noted hereinabove, a portion of the separated solids may be introduced into the reactive processing stage as a seeding agent.

Thus, in accordance with an exemplary aspect of the embodiment illustrated in FIG. 1, product slurry 107 from reactive processing step 1030 is subjected to atmospheric flashing 1035 in one or more atmospheric flash tanks or any other suitable atmospheric system to release pressure and to evaporatively cool the product slurry 107 through the release of steam to form a flashed product slurry 108. The flashed product slurry preferably has a temperature ranging from about 90° C. to about 101° C., a copper concentration of from about 40 to about 120 grams/liter, and an acid concentration of from about 16 to about 50 grams/liter. In accordance with an aspect of an exemplary embodiment of the invention, a portion of flashed product slurry 108 (stream 123 in FIG. 1), is recycled to pressure leaching stage 1030.

Flashed product slurry 108 also may contain a particulate solid residue containing, for example, the iron oxide by-product of pressure leaching, elemental sulfur and other by-products, precious metals and other components that are undesirable for a feed stream to an electrowinning circuit. Thus, in accordance with the same principles discussed above, it may be desirable to subject the flashed product slurry to a solid-liquid separation process, such that the liquid portion of the slurry—the desired copper-containing solution—is separated from the solid portion of the slurry—the undesired residue.

Referring still to FIG. 1, in the illustrated embodiment of the invention, flashed product slurry 108 is directed to a solid-liquid separation stage 1040, such as a CCD circuit. In an alternative embodiment of the invention, solid-liquid separation stage 1040 may comprise, for example, a thickener or one or more filters. In one aspect of an exemplary embodiment of the invention, a CCD circuit uses conventional countercurrent washing of the residue stream with wash water 109 to recover leached copper to the copper-containing solution product and to minimize the amount of soluble copper advancing to either precious metal recovery processes or residue disposal. Preferably, large wash ratios and/or several CCD stages are utilized to enhance the effectiveness of solid-liquid separation stage 1040—that is, relatively large amounts of wash water 109 are added to the residue in the CCD circuit and/or several CCD stages are used. Preferably, the solution portion of the residue slurry stream is diluted by wash water 109 in the CCD circuit to a copper concentration of from about 5 to about 200 parts per million (ppm) in the solution portion of residue stream 110. In accordance with another aspect of an exemplary embodiment of the invention, addition of a chemical reagent to liquid/solid separation stage 1040 may be desirable to remove deleterious constituents from the process stream. For example, a polyethylene oxide may be added to effectuate removal of silica by precipitation, or other flocculants and/or coagulants might be utilized to remove other undesirable species from the process stream. One such suitable chemical reagent is POLYOX™ WSR-301, available from Dow Chemical.

Depending on its composition, residue stream 110 from liquid/solid separation stage 1040 may be neutralized, impounded, disposed of, or subjected to further processing, such as, for example, precious metal recovery, treatment to recover other metal values, treatment to attenuate or remediate metals of concern, or other treatment to recover or remove other mineral constituents from the stream. For example, if residue stream 110 contains economically significant amounts of gold, silver, and/or other precious metals, it may be desirable to recover this gold fraction through a cyanidation process or other suitable recovery process. If gold or other precious metals are to be recovered from residue stream 110 by cyanidation techniques, the content of contaminants in the stream, such as elemental sulfur, amorphous iron precipitates, unreacted copper minerals and dissolved copper, is preferably minimized. Such materials may promote high reagent consumption in the cyanidation process and thus increase the expense of the precious metal recovery operation. As mentioned above, it is therefore preferable to use a large amount of wash water or other diluent or several stages during the solid-liquid separation process to maintain low copper and acid levels in the solids-containing residue stream in an attempt to optimize the conditions for subsequent precious metal recovery.

Optionally, as illustrated in FIG. 1 as an aspect of one exemplary embodiment of the invention, one or more additional electrolyte treatment stages 1050 may be utilized to further condition and/or refine process stream 111 from solid-liquid separation stage 1040, such as, for example, through filtration, thickening, counter-current decantation, or the like. Moreover, a portion of process stream 111 (stream 122 in FIG. 1) may be recycled to pressure leaching stage 1030, either directly or through combination with lean electrolyte recycle stream 119 (as shown) and/or other suitable process streams entering the pressure leaching operation. In accordance with an exemplary embodiment, residue stream 114 from electrolyte treatment stage 1050 is subjected to further treatment 1080, wherein, depending on the conditions of residue stream 114, all or a portion of the stream may be neutralized, impounded, disposed of, or subjected to further processing as described above.

In accordance with one embodiment of the present invention, and with momentary reference to FIG. 2, residue stream 108, residue stream 110, and/or residue stream 114 can be used in augmenting a heap or dump leaching process, the PLS of which may be processed in connection with respective solution extraction step 2010, stripping step 2015 and electrowinning step 2030, as will hereinafter be described. Copper-containing solution stream 113 from electrolyte treatment stage 1050 is then preferably subjected to copper recovery; in accordance with one aspect of an exemplary embodiment, however, a portion of copper-containing solution stream 113 (stream 120 in FIG. 1) may be recycled to pressure leaching stage 1030.

Referring again to FIG. 1, in accordance with one aspect of an embodiment of the invention, copper-containing solution stream 113 from electrolyte treatment stage 1050 is sent to an electrolyte recycle tank 1060. Electrolyte recycle tank 1060 suitably facilitates process control for electrowinning circuit 1070, as will be discussed in greater detail below. Copper-containing solution stream 113, is preferably blended with a lean electrolyte stream 121 in electrolyte recycle tank 1060 at a ratio suitable to yield a product stream 115, the conditions of which may be chosen to optimize the resultant product of electrowinning circuit 1070.

With continued reference to FIG. 1, copper from the product stream 115 is suitably electrowon to yield a pure, cathode copper product (stream 116). In accordance with the various aspects of the invention, a process is provided wherein, upon proper conditioning of a copper-containing solution, a high quality, uniformly-plated cathode copper product 116 may be realized without subjecting the copper-containing solution to a solvent/solution extraction process prior to entering the electrowinning circuit.

As those skilled in the art are aware, a variety of methods and apparatus are available for the electrowinning of copper and other metal values, any of which may be suitable for use in accordance with the present invention, provided the requisite process parameters for the chosen method or apparatus are satisfied. For the sake of convenience and a broad understanding of the present invention, an electrowinning circuit useful in connection with various embodiments of the invention may comprise an electrowinning circuit, constructed and configured to operate in a conventional manner. The electrowinning circuit may include electrowinning cells constructed as elongated rectangular tanks containing suspended parallel flat cathodes of copper alternating with flat anodes of lead alloy, arranged perpendicular to the long axis of the tank. A copper-bearing leach solution may be provided to the tank, for example at one end, to flow perpendicular (referring to the overall flow pattern) to the plane of the parallel anodes and cathodes, and copper can be deposited at the cathode and water electrolyzed to form oxygen and protons at the anode with the application of current. Other electrolyte distribution and flow profiles may be used.

The primary electrochemical reactions for electrowinning of copper from acid solution is believed to be as follows:

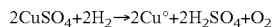

Cathode half-reaction: $Cu^{2+}+2e^- \rightarrow Cu^\circ$

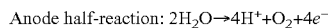

Turning again to FIG. 1, in a preferred embodiment of the invention, product stream 115 is directed from electrolyte recycle tank 1060 to an electrowinning circuit 1070, which contains one or more conventional electrowinning cells. It should be understood, however, that any method and/or apparatus currently known or hereinafter devised suitable for the electrowinning of copper from acid solution, in accordance with the above-referenced reactions or otherwise, is within the scope of the present invention.

In accordance with a preferred aspect of the invention, electrowinning circuit 1070 yields a cathode copper product 116, optionally, an offgas stream (not shown), and a relatively large volume of copper-containing acid solution, herein designated as lean electrolyte stream 117. As discussed above, in the illustrated embodiment of the invention, a portion of lean electrolyte stream 117 (lean electrolyte recycle stream 119 in FIG. 1) is preferably recycled to pressure leaching stage 1030 and/or to electrolyte recycle tank 1060. Optionally, a portion of copper-containing solution stream 113 (stream 120 in FIG. 1) from electrolyte treatment stage 1050 is combined with lean electrolyte recycle stream 119 and is recycled to pressure leaching stage 1030. Moreover, in accordance with one aspect of an exemplary embodiment of the invention, a portion of lean electrolyte stream 117 (lean electrolyte bleed stream 118 in FIG. 1) is removed from process 100 for the removal of impurities and acid and/or residual copper recovery operations, such as, for example, those illustrated in FIG. 2.

Preferably, lean electrolyte recycle stream 119 comprises at least about 50 percent by weight of lean electrolyte stream 117, more preferably from about 60 to about 95 percent by weight of lean electrolyte stream 117, and more preferably from about 80 to about 90 percent by weight of lean electrolyte stream 117. Preferably, lean electrolyte bleed stream 118 comprises less than about 50 percent by weight of lean electrolyte stream 118, more preferably from about 5 to about 40 percent by weight of lean electrolyte stream 117, and more preferably from about 10 to about 20 percent by weight of lean electrolyte stream 117.

Copper values from the metal-bearing product stream 115 are removed during electrowinning step 1070 to yield a pure, cathode copper product. It should be appreciated that in accordance with the various aspects of the invention, a process wherein, upon proper conditioning of the metal-bearing solution, a high quality, uniformly-plated cathode copper product may be realized without subjecting the metal-bearing solution to solvent/solution extraction prior to entering the electrowinning circuit is within the scope of the present invention. As previously noted, careful control of the conditions of the metal-bearing solution entering an electrowinning circuit—especially maintenance of a substantially constant copper composition in the stream—can enhance the quality of the electrowon copper by, among other things, enabling even plating of copper on the cathode and avoidance of surface porosity in the cathode copper, which degrades the copper product and thus may diminish its economic value. In accordance with this aspect of the invention, such process control can be accomplished using any of a variety of techniques and equipment configurations, so long as the chosen system and/or method maintains a sufficiently constant feed stream to the electrowinning circuit. As those skilled in the art are aware, a variety of methods and apparatus are available for the electrowinning of copper and other metal values, any of which may be suitable for use in accordance with the present invention, provided the requisite process parameters for the chosen method or apparatus are satisfied.

Figure 2:
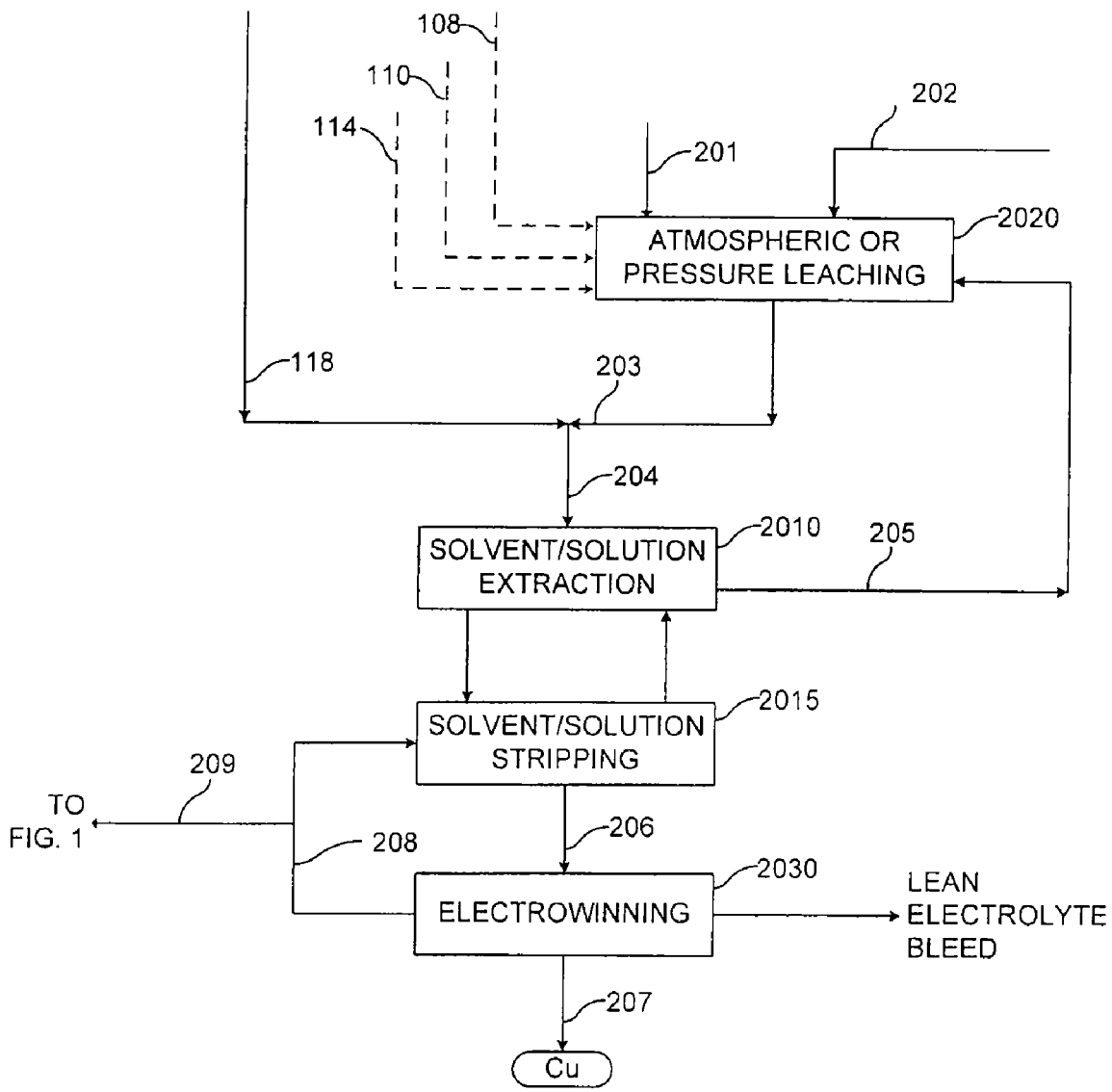
FIG. 2 illustrates a flow diagram of various aspects of a copper recovery process in accordance with an exemplary embodiment of the present invention; and, FIG. 3 is a graph plotting copper concentration in the pressure leaching residue as a function of acid addition in accordance with various aspects of an exemplary embodiment of the invention.
Figure 3:
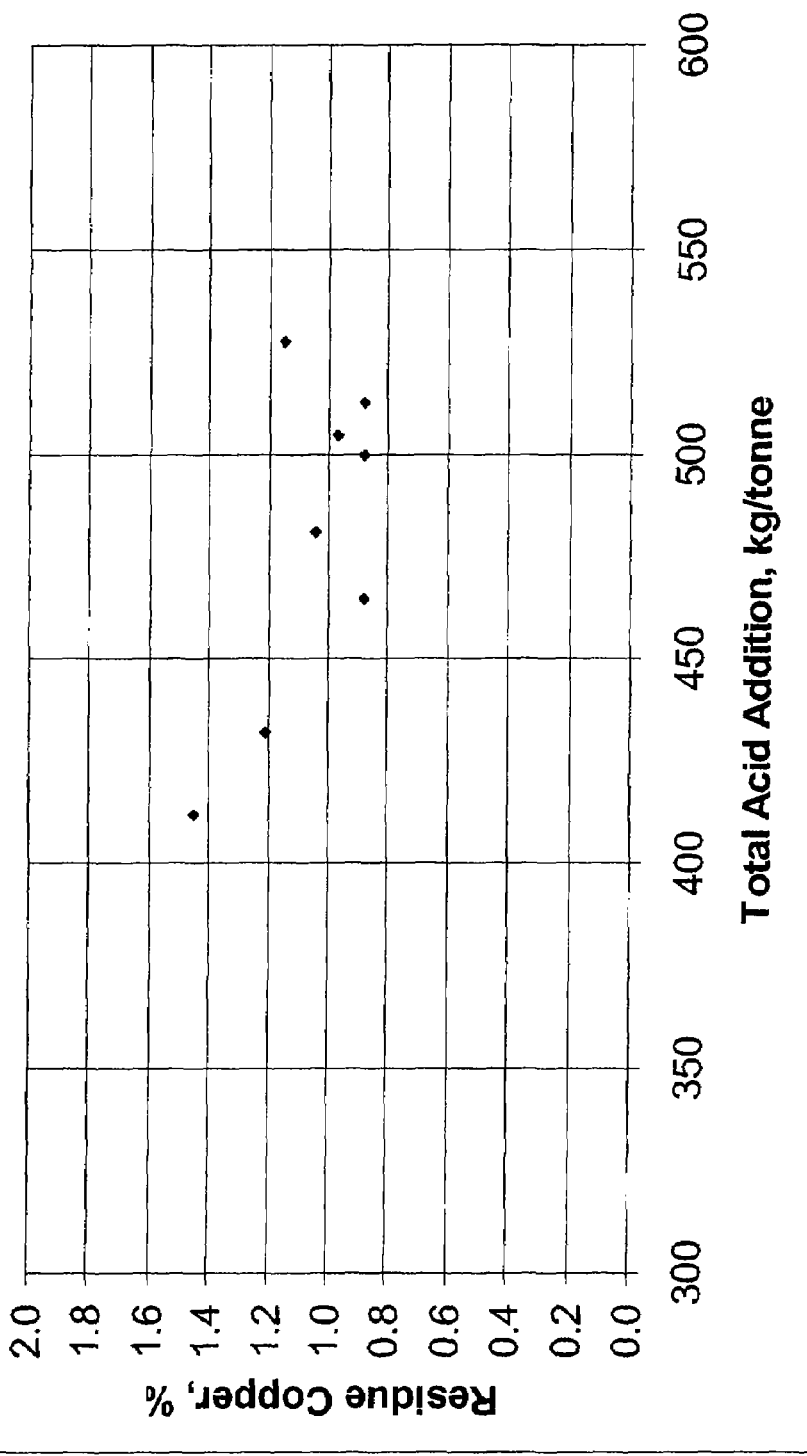

In accordance with an exemplary embodiment of the invention illustrated in FIG. 2, lean electrolyte bleed stream 118 from electrowinning unit 1070 (FIG. 1) is sent to a solvent/solution extraction stage 2010. In accordance with one embodiment of the invention, solvent/solution extraction stage 2010 is configured to treat materials from atmospheric and/or pressure leach operations 2020 as well as lean electrolyte bleed stream 118. Leach operation 2020 may utilize any conventional or hereinafter developed atmospheric or pressure leaching method, including, for example, heap leaching, stockpile leaching (also sometimes referred to in the art as "dump leaching"), vat leaching, tank leaching, agitated tank leaching, in situ leaching, pressure leaching, or other process. In accordance with one aspect of a preferred embodiment of the invention, leach operation 2020 is a conventional acid-consuming heap leach operation, wherein a low grade ore 201 is contacted with an acid-containing stream 202 and, optionally, other process streams, such as raffinate stream 205 from solvent/solution extraction unit 2010. In leach operation 2020, the acid percolates downward through the ore heap, solubilizing the copper in the copper-containing ore in the form of copper sulfate, to form a copper-rich pregnant leach solution (PLS) stream 203. In accordance with one aspect of a preferred embodiment of the invention, PLS 203 from a heap leach operation 2020 is combined with lean electrolyte bleed stream 118 prior to entering solvent/solution extraction stage 2010 as process stream 204.

As discussed hereinabove, and with further reference to FIG. 2, leach operation 2020 may be augmented through the addition of pressure leaching residue. In accordance with various exemplary embodiments of this aspect of the present invention, all or part of the pressure leaching residue may be agglomerated with ore material, or may be added to the heap feed material before, during, and/or after agglomeration, or may be added to the ore or other leach material used in leach operation 2020.

Notwithstanding the foregoing, it should be appreciated that residue addition to leach operation 2020 may be carried out in any now known or hereafter devised method. As such, the pressure leaching residue may be pretreated, processed, or otherwise handled in any suitable manner, for example, by using flotation to upgrade the sulfur content of the residue. Residue addition is believed to enhance the performance parameters of leach operation 2020.

In accordance with a further aspect of this embodiment of the present invention, as previously briefly mentioned, lean electrolyte bleed stream 118 advantageously may remove impurities from the process, for example the electrowinning process. Such impurities include, without limitation, iron, aluminum, silica, selenium, magnesium, manganese, sodium, potassium and others. In the absence of removal, such impurities may accumulate to deleterious levels, and, as such negatively impact production efficiencies and product (e.g., copper cathode) quality. The presence of such impurities in lean electrolyte bleed stream 118 generally does not negatively impact the aforementioned handling of lean electrolyte bleed stream 118.

As will be discussed in further detail hereinbelow, in a further embodiment of the present invention, impurities may be removed prior to pressure leaching through any suitable means, such as precipitation or other steps.

With further reference to FIG. 2, solvent/solution extraction stage 2010 and solution stripping stage 2015 purify copper-bearing process stream 204 in two unit operations—an extraction operation, which may have multiple stages, followed by a stripping operation. In the extraction stage, process stream 204 is contacted with an organic phase consisting of a diluent in which a copper selective reagent (i.e., the extractant) is admixed. When the solutions are contacted, the organic extractant chemically removes the copper from stream 204, forming a copper-depleted aqueous raffinate stream. The raffinate and organic streams are subsequently separated in a settler. After separation of the organic and aqueous phases in the settler, a portion of the aqueous phase (stream 205) is typically returned to one or more leaching operations to be reloaded with copper from the ore in the atmospheric leach to form the PLS, or may be recycled to other process areas or appropriately disposed of. The organic stream passes on to the second unit operation of the solvent/solution extraction process, the stripping operation. In the stripping operation, the organic stream is contacted with a strongly acidic electrolyte. This acidic solution "strips" the copper from the extractant, leaving the organic phase substantially depleted of copper. At least a portion of the loaded strip solution aqueous phase (stream 206) is advanced to an electrowinning plant 2030 as a copper "rich" solution. Aqueous stream 206 is processed in electrowinning plant 2030 to yield cathode copper 207 and a copper-containing lean electrolyte stream 208, which, in one aspect of a preferred embodiment of the invention, may be recycled in part to solvent/solution extraction unit 2010 and/or to pressure leaching stage 1030 (stream 209 to FIG. 1) and/or to other process areas.

In accordance with one alternative aspect of the invention, aqueous stream 206 may not be subjected to electrowinning immediately after leaving the solvent/solution extraction unit, but may instead be blended with other copper-containing process streams, and the resultant stream then sent to an electrowinning circuit. For example, all or a portion of aqueous stream 206 may be blended with a copper-containing solution stream (not shown) and a lean electrolyte stream (not shown) in electrolyte recycle tank 1060 (from FIG. 1) to form a resultant product stream suitable for electrowinning in an electrowinning circuit. In such cases the stripping solutions used in solvent/solution extraction 2010 likely will be comprised of spent electrolyte from electrowinning circuit 1070 (from FIG. 1).

Impurity removal may be further facilitated by suitable processing in advance of pressure leaching, such as by the aforementioned separation and/or precipitation step. In accordance with this further aspect of the present invention as previously mentioned, advantageously impurities may be removed from the process, for example, the electrowinning process. Such impurities include, without limitation, iron, aluminum, magnesium, sodium, potassium and the like, often present as sulfates. In the absence of removal, such impurities may accumulate to deleterious levels, and, as such negatively impact production efficiencies and product (e.g. copper cathode) quality.

The Example set forth hereinbelow is illustrative of various aspects of a preferred embodiment of the present invention. The process conditions and parameters reflected therein are intended to exemplify various aspects of the invention, and are not intended to limit the scope of the claimed invention.

Example 1

Copper was recovered from chalcopyrite-containing concentrate using continuous medium temperature pressure leaching and direct electrowinning in accordance with an exemplary embodiment of the invention. Table 1, below, sets forth the process conditions and operating parameters utilized.

TABLE 1

| FEED | |
|---|---|
| Concentrate Type | Chalcopyrite |
| Concentrate Analyses, % | |
| Cu | 31.6 |
| Fe | 30.5 |
| S | 34.2 |
| Grind Size. $P_{98}$, μm | 15 |
| PRESSURE LEACHING | |
| Temperature, °C. | 160 |
| Time, min | 90 |
| Acid Addition Rate, kg acid/tonne feed | 450 |
| CLS Addition Rate, kg CLS/tonne feed | 10 |
| Oxygen Overpressure, psi | 200 |
| Total Pressure, psi | 290 |

TABLE 1-continued

| | |
|---|---|
| Feed Solids to Compartment 1, % | 10.3 |
| Weight Loss, % | 20 |
| Discharge Solids, % | 7.4 |
| Discharge Solution, g/L | |
| Cu | 102 |
| Fe | 4.6 |
| $H_2SO_4$ | 11.6 |
| Discharge Solids, % | |
| Cu | 1.5 |
| Fe | 35.9 |
| Cu Extraction, % | 96.6 |
| Sulfide Oxidized to Elemental Sulfur, % | 69 |
| Sulfide Oxidation to Sulfate, % | 27 |
| ELECTROWINNING | |
| Current Density, $A/m^2$ | 308 |
| Cell Temperature, ° C. | 50 |
| Specific Flow, L/min-m2 | 3.0 |
| FC-1110 (Mist Control), gal/$10^6$ lb Cu | 10 |
| PD-4201 (Leveling Agent), g/tonne Cu | 334 |
| Lean Electrolyte, g/L | |
| Cu | 34 |
| Fe | 3.3 |
| $H_2SO_4$ | 135 |
| Current Efficiency, % | 88 |
| Copper Removed by Electrowinning, % | 84 |

An effective and efficient method to recover copper from metal-bearing materials, especially copper from copper sulfides, such as chalcopyrite, that enables high copper recovery at a reduced cost over conventional processing techniques has been presented herein. In accordance with the present invention, it has been shown that copper recovery in excess of about 96 to about 98 percent is achievable while realizing various important economic benefits of medium temperature pressure leaching and circumventing processing problems historically associated with medium temperature pressure leaching. Moreover, the present invention provides a substantially acid-autogenous process for recovering copper from chalcopyrite-containing ore using pressure leaching and direct electrowinning in combination with an atmospheric leaching, solvent/solution extraction, and electrowinning steps.

The present invention has been described above with reference to a number of exemplary embodiments and examples. It should be appreciated that the particular embodiments shown and described herein are illustrative of the invention and its best mode and are not intended to limit in any way the scope of the invention. Those skilled in the art having read this disclosure will recognize that changes and modifications may be made to the exemplary embodiments without departing from the scope of the present invention. Further, although certain preferred aspects of the invention are described herein in terms of exemplary embodiments, such aspects of the invention may be achieved through any number of suitable means now known or hereafter devised. Accordingly, these and other changes or modifications are intended to be included within the scope of the present invention.

What is claimed is:

1. A method of recovering copper from a copper-bearing material, comprising the steps of:
   (a) providing a feed stream comprising a copper-bearing material;
   (b) subjecting at least a portion of said feed stream to controlled fine grinding;
   (c) pressure leaching at least a portion of said feed stream in an oxidizing environment at an elevated temperature and pressure to yield a product slurry comprising a copper-bearing solution and a residue;
   (d) conditioning said product slurry without the use of solvent/solution extraction techniques to yield a copper-bearing solution suitable for electrowinning;
   (e) electrowinning copper from said copper-bearing solution from said conditioning step to yield cathode copper and a copper-bearing lean electrolyte stream;
   (f) recycling a portion of said lean electrolyte stream to said pressure leaching step;
   (g) treating at least a portion of said lean electrolyte stream from said electrowinning step using solvent/solution extraction techniques; and
   (h) directing at least a portion of a residue from said pressure leaching step to a heap, stockpile or other leaching operation.

2. The method of claim 1, wherein said step (h) of directing at least a portion of a residue from said pressure leaching stage to a heap, stockpile or other leaching operation comprises the transfer of a residue comprising a sulfur-bearing material to such operation.

3. The method of claim 1, wherein said step of providing a feed stream comprising a copper-bearing material comprises providing a feed stream comprising at least one of chalcopyrite, chalcocite, bornite, covellite, digenite, and enargite, or mixtures or combinations thereof.

4. The method of claim 1, wherein said step of providing a feed stream comprising a copper-bearing material comprises providing a feed stream comprising a copper-bearing material and a solution stream comprising copper and acid.

5. The method of claim 1, wherein said step of subjecting at least a portion of said feed stream to controlled fine grinding comprises reducing the particle size of said feed stream such that substantially all of the particles in said feed stream react substantially completely during pressure leaching.

6. The method of claim 5, wherein said step of subjecting at least a portion of said feed stream to controlled fine grinding comprises reducing the particle size of said feed stream to a P80 of less than about 25 microns.

7. The method of claim 5, wherein said step of subjecting at least a portion of said feed stream to controlled fine grinding comprises reducing the particle size of said feed stream to a P80 of from about 13 to about 20 microns.

8. The method of claim 5, wherein said step of subjecting at least a portion of said feed stream to controlled fine grinding comprises reducing the particle size of said feed stream to a P98 of less than about 25 microns.

9. The method of claim 5, wherein said step of subjecting at least a portion of said feed stream to controlled fine grinding comprises reducing the particle size of said feed stream to a P98 of from about 10 to about 23 microns.

10. The method of claim 5, wherein said step of subjecting at least a portion of said feed stream to controlled fine grinding comprises reducing the particle size of said feed stream to a P98 of from about 13 to about 15 microns.

11. The method of claim 1, wherein said leaching step comprises leaching at least a portion of said feed stream in a pressure leaching vessel at a temperature of from about 140° C. to about 230° C. and at a total operating pressure of from about 100 psi to about 750 psi.

12. The method of claim 1, wherein said step (h) comprises directing said residue by agglomerating said residue with ore material to be used in said heap, stockpile or other leaching operation.

13. The method of claim 1, wherein said step of pressure leaching said feed stream comprises pressure leaching said feed stream in the presence of a surfactant selected from the group consisting of lignin derivatives, orthophenylene diamine, alkyl sulfonates, and mixtures thereof.

14. The method of claim 1, wherein said conditioning step comprises subjecting at least a portion of said product slurry to solid-liquid separation, wherein at least a portion of said copper-bearing solution is separated from said residue.

15. The method of claim 14, wherein said conditioning step further comprises blending at least a portion of said copper-bearing solution with at least a portion of one or more copper-bearing streams to achieve a copper concentration of from about 15 grams/liter to about 80 grams/liter in said copper-bearing solution.

16. The method of claim 14, wherein a portion of said copper-bearing solution from said conditioning step is recycled to said pressure leaching step.

17. The method of claim 1, wherein said conditioning step comprises subjecting at least a portion of said product slurry to filtration, wherein at least a portion of said copper-bearing solution is separated from said residue.

18. The method of claim 1, wherein said conditioning step comprises separating at least a portion of said residue from said copper-bearing solution in said product slurry, and further comprises using at least a portion of said residue as a seeding agent in said pressure leaching step.

19. The method of claim 1, further comprising the step of (i) using a portion of said lean electrolyte stream from said electrowinning step in a leaching operation.

* * * * *